United States Patent

Sterner et al.

[11] 4,099,676
[45] Jul. 11, 1978

[54] APPARATUS FOR SPREADING FERTILIZER, PLANT KILLER OR SIMILAR AGENTS FROM AN AIRCRAFT

[75] Inventors: Thore Sterner; Arne Johansson, both of Borlänge, Sweden

[73] Assignee: Sterner Aero Aktiebolag, Borlange, Sweden

[21] Appl. No.: 695,321

[22] Filed: Jun. 14, 1976

[51] Int. Cl.² .............................................. A01C 17/00
[52] U.S. Cl. ..................................... 239/687; 239/171
[58] Field of Search ................ 244/17.19, 136, 137 R; 239/687, 689, 171

[56] References Cited

U.S. PATENT DOCUMENTS

| 3,428,276 | 2/1969 | Hubbard | 239/171 X |
| 3,463,398 | 8/1969 | Smith et al. | 239/171 |
| 3,512,721 | 5/1970 | Barlow et al. | 239/171 |
| 3,519,080 | 7/1970 | Rochat | 239/171 X |
| 3,558,005 | 1/1971 | Crabtree | 239/171 X |

Primary Examiner—John J. Love
Attorney, Agent, or Firm—Dressler, Goldsmith, Clement, Gordon & Shore, Ltd.

[57] ABSTRACT

Apparatus for spreading fertilizer, plant killer, or similar agents from an aircraft which includes a container in which the agents are disposed, which container contains at its lower end rotating dispersion means for spreading agents to the surrounding area. The container further includes stabilizing means secured thereto for keeping the container in a predetermined attitude relative to the aircraft while maintaining the central axis of the container in substantially vertical position. The position of the container will be maintained independent of the amount of agent in the container and the flying speed of the aircraft.

6 Claims, 3 Drawing Figures

APPARATUS FOR SPREADING FERTILIZER, PLANT KILLER OR SIMILAR AGENTS FROM AN AIRCRAFT

The present invention relates to an apparatus for spreading fertilizer, plant killer, or similar agents from an aircraft, said apparatus comprising a container intended for removably connecting to the aircraft and having means for discharging the said agent, which it contains, through at least one opening made in the container.

Apparatus of this kind are already known. Such a known apparatus comprises a container intended for removably connecting to a helicopter, for example, and which is connected to a motor-driven discharging device, which on rotation throws material, e.g., granulated fertilizer, out through a circular discharge opening in the bottom of the container. The container consists in general of a hollow vertical cylinder to the lower opening of which is attached the larger opening of a hollow truncated cone. The smaller opening of the cone thus forms the discharge opening. The fertilizing agent is intended to be introduced through the upper opening of the cylinder.

To the container there are attached a leg structure supporting the container in its vertical position on the ground, and a stirrup-like suspending means which is intended for removably coupling to a helicopter, for example. This stirrup can be rigidly connected to the container, or the container can also be pivotable at two points on the stirrup, in a vertical plane parallel to the flight direction of the helicopter.

A container of the kind described above is burdened with many drawbacks. In the first place, it does not have a shape which cooperates to reduce air resistance, and does not include any means keeping it in a predetermined position in relation to the helicopter mainly independent of wind conditions, the speed of the helicopter and the amount of fertilizer in the container. During fertilizing from the air, the container will twist round its vertical central axis when the discharge device rotates, or the suspension means will be exposed to twisting stresses if this means resists such rotation. Further, the container will swing backwards and forwards in a vertical plane parallel to the direction of flight, the extent of this swinging motion depending on the flight speed and amount of fertilizer in the container. This oscillation notably increases air resistance, especially when the filling opening of the container is turned into the direction of flight, i.e., forwards, and causes unstable flying conditions, increased stress on the suspension means, an impaired fertilizing pattern, etc. A still further reason for the good fertilizing pattern, i.e., the even spread of fertilizer, becoming worse is that the fertilizer granules are broken up against the leg structure surrounding the container and are therefore prevented from being thrown out to the required degree. Furthermore, the leg structure notably increases air resistance and is an obstruction when transporting the container to different fertilizing depots with ground vehicles.

The object of the present invention is to remove at least most of the drawbacks with which previously known apparatus are burdened. This object is achieved by the invention having been given the characterizing features disclosed in the claims.

The invention will now be described while referring to the appended drawings, in which.

Figure 1:
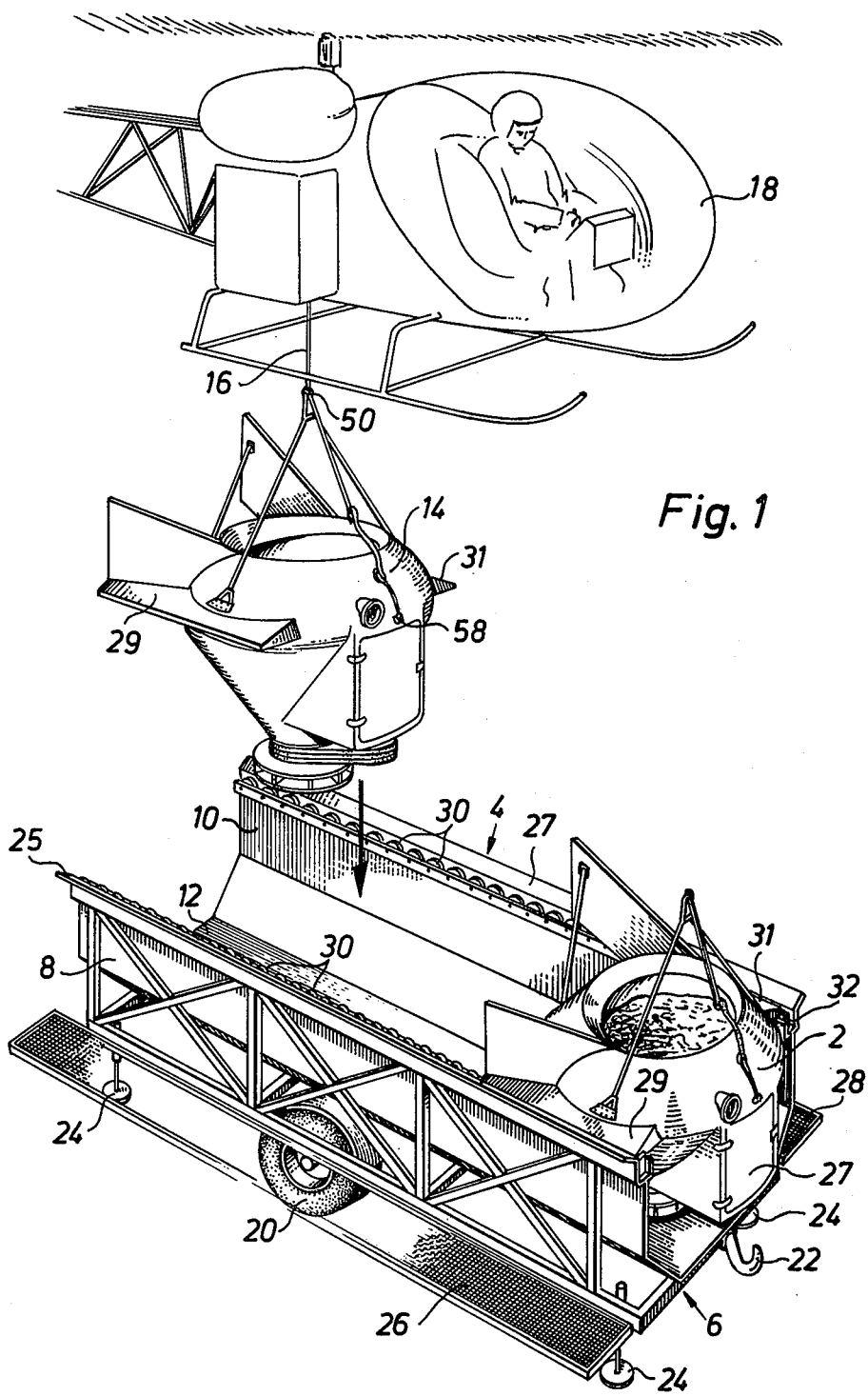
FIG. 1 is a perspective view of the apparatus according to the invention, comprising a container with fertilizing agent, supported by a carriage, and an empty container suspended in a helicopter and which is in the process of being lowered down to the carriage behind the first-mentioned container.

A container 2 filled with granular fertilizer is supported in FIG. 1 by a carriage 4, consisting of a chassis 6 including a frame and two vertical sidewalls 8 and 10, the lower portions of which converge downwardly and are attached to a bottom plate 12. The sidewalls 8 and 10 and the bottom plate 12 form together a trough-like space, open at the ends, for the container 2 and a further container 14 which is identical to the container 2 and which in FIG. 1 is shown suspended in a cable 16 depending from a helicopter 18. The carriage 4, which is provided with a pair of wheels 20 and a towing bar 22, is intended for moving by some kind of ground vehicle to, or in the vicinity of, the place where fertilizing is to take place. At said place, supporting legs 24 attached to the chassis and vertically displaceable are adjusted so that the carriage assumes a substantially horizontal attitude, whereafter platforms 26 and 28, pivotably attached to the lower portion of the chassis 6 and normally lying along the vertical outer sides of the frame, are folded out to the horizontal position shown in the figure.

With the carriage 4 in the position shown in FIG. 1, two people standing on the platforms 26 and 28 can firstly dispose the container 14 set down by the helicopter 18 so that both its wing-shaped supporting elements 29 and 31 are arranged to abut against supporting means attached to the upper edges of the sidewalls 8, 10, said means being in the shape of rollers 30 situated within obliquely upwardly directed guide flanges 25 and 27 on the beams supporting the rollers, secondly, unhitch the container 14 from the cable 16, thirdly, hitch the container 2 to the cable 16 and connect a junction box attached to the container to a junction box (not shown) on a cable hanging from the helicopter after the helicopter has been moved forward a short distance, fourthly, assist lifting the container 2 from the carriage, fifthly, push the container 14 dumped on the rear portion of the carriage forward on the rollers 30 until it comes against the stops 32 which are fixed to the beams carrying the rollers at the forward ends thereof, and sixthly, fill the container 2 with the necessary amount of fertilizer.

Figure 2:
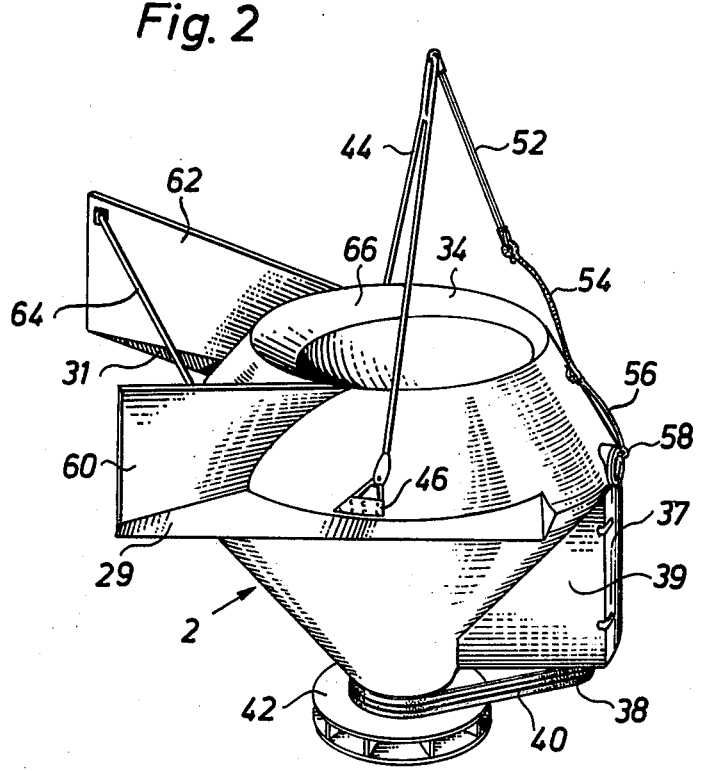
FIG. 2 is a perspective view of one of the containers shown in FIG. 1.
Figure 3:
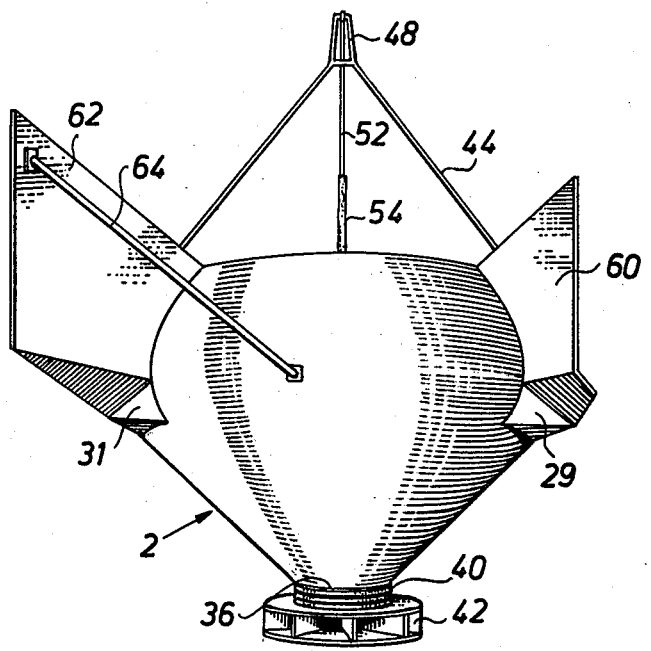
FIG. 3 is an elevation seen from behind of the container in FIG. 2.

The container 2 is shown more closely in FIGS. 2 and 3. Its upper portion is mainly in the shape of a hollow sphere with two opposing spherical segments cut off so that two openings are formed, of which one constitutes the filling opening 34 of the container 2, and the lower portion of the container has the shape of a hollow truncated cone, the greater opening of which is connected to the lower opening of the hollow sphere and the lower or smaller opening of the cone forms a discharge opening 36 for the fertilizer. This shape of the container, which is made in fiberglass, has the result that it is very stable and in principle selfsupporting, and also that it has very small air resistance when it is transported by the helicopter.

A box-shaped engine room 39 is arranged on the outside of the container 2 and is accessible through a hatch 37. The engine room 39 contains a petrol motor (not shown), the driving shaft 38 of which is connected by V-belts 40 to a conventional discharging device 42 which on rotation throws the fertilizer substantially radially outwardly, and thus spreads it out over an extensive ground area under the helicopter. As may be seen from the Figures, this spread is not obstructed by any means arranged on the container 2 or on the helicopter, such as, leg structures, and the like. The engine can either be started manually when the container 2 assumes the position shown in FIG. 1, or it can be started by remote control from the helicopter cabin. In the latter case, an electrical connection between the motor and the helicopter cabin is required. To regulate the amount of fertilizer discharged through the opening 39, there is arranged a conventional adjustable discharging nozzle (not shown) inside the container in conjunction with this opening, and operable electrically from the helicopter cabin.

The suspending device of the container 2 consists of a V-shaped stirrup 44, both legs of which are pivotally fastened at their ends to the trunnion fittings 46, situated somewhat behind the central axis of the container perpendicular to the flight direction. The legs are joined to each other and at their junction form an eye 48 for a hook 50 attached to the cable 16 depending from the helicopter. One end of a cable 52 is attached to the eye 48 and its other end is attached to a spring 54. A second cable 56 is attached at one end to a hook or eye 58 on the forward side of the container 2 and its other end is attached to the spring 54. The collective length of wires 52, 56 and spring 54 is so selected that cables and spring are insignificantly slack when the container 2 is hanging vertically from the helicopter. The spring 54 is intended inter alia to take up the possible shocks which can arise when the container 2 swings round its horizontal axis going through the trunnions 46. The spring 54 also has another important function. When the container 2 is empty, it will substantially assume the position shown in FIG. 2, i.e., its vertical central axis will lie vertically in the flight direction and behind the eye 48 and the hook 50, the stirrup 44 forming an acute angle with the vertical, and the spring 54 preventing the container from tipping forward, to avoid the opening 34 being exposed to the wind and thereby cause great air resistance. When the container 2 is filled with fertilizer the stirrup 44 will assume a substantially vertical position and the spring 54 is stretched to coact in keeping the central axis of the container substantially vertical. As the container 2 is emptied the tension in the spring 54 is successively reduced, and therefore the container will assume a stable position in which its central axis is substantially vertical virtually independent of the amount of fertilizer in the container.

At its upper rear portion, the container 2 is provided with two stabilizing fins 60 and 62 which are situated in two vertical planes at an angle of about 45° to each other. The fin 62, which is somewhat larger than the fin 60 to compensate for the torque set up by the discharging device 42 is braced in its rear upper portion by a strut 64 attached to the container wall, to prevent the fin being bent or broken by stresses caused by the wind. The fins 60 and 62 thus stabilize the container so that during flight it is kept in the attitude shown in FIG. 1 without striving to rotate about its vertical central axis which would cause twisting of the cable 16 or cause stresses in the stirrup 44 of the suspending means.

The filling opening 34 of the container 2 is surrounded by an angular collar 66 made integral with the upper edge of the container, the collar having the task of partly stabilizing the container against wind shocks caused by oscillations in it, and partly reducing the air resistance offered by the opening 34. The collar 66 is somewhat wider in its rear portion and successively merges into a narrow portion which is narrowest at the forward portion of the container 2 so that the opening 34 is still substantially circular. The collar 66 slopes downwardly towards the center of the container.

When, due, for example, to wind shocks, the container swings backwards or forwards around its horizontal central axis at right angles to the direction of flight, or around the hook 50 or the attachment of the wire 16 in the helicopter, the collar 66 together with the spring 54 acts against these oscillations so that they do not become too heavy and prevents them from being continued. The collar 66 also prevents the container 2 from assuming a somewhat forwardly inclined attitude.

The aerodynamically shaped supporting elements 29 and 31 are attached to the wall of the container and to the lower edges of the fins 60 and 62, which is best shown in FIGS. 2 and 3, thereby hindering the fins from deflecting during flight. The supporting elements 29 and 31 are each provided with a horizontal planar bottom surface, which is intended to rest and glide on the rollers 30 when the container is dumped on the carriage 4.

An embodiment of the invention has been described above. It should, however, be understood that the invention is not limited to this embodiment, but is only limited by the scope of the appended patent claims.

What is claimed is:

1. Apparatus for spreading granulated agents from an aircraft comprising a container containing agents and being constructed and arranged to be removably attached to an aircraft, said container defining a first opening, rotating dispersion means connected to said container in communication with said first opening for spreading agent to the surrounding area, stabilizing means secured to said container for keeping the container in a predetermined attitude relative to the aircraft including two fins having surfaces of different sizes attached to the rear portion of the container and forming an acute angle with a vertical plane parallel to the direction of flight of the aircraft for keeping the central axis of the container substantially in a predetermined position parallel with the flight direction of the aircraft when the dispersion device rotates, substantially independent of the amount of agent in the container and the flying speed of the aircraft.

2. Apparatus for spreading granulated agents from an aircraft comprising a container containing agents and being constructed and arranged to be removably attached to an aircraft, said container defining a first opening, rotating dispersion means connected to said container in communication with said first opening for spreading agent to the surrounding area, stabilizing means secured to said container for keeping the container in a predetermined attitude relative to the aircraft and the central axis of the container in a substantially vertical position substantially independent of the amount of agent in the container and the flying speed of the aircraft, the stabilizing means also including a stirrup, both legs of which are attached to two opposing sides of the container and removably connected to the aircraft, whereby the line linking the attachment points of the legs is substantially at a right angle to the direction of flight of the aircraft, and resilient means connected between the stirrup and the surface of the container facing the direction of flight.

3. Apparatus for spreading granulated agents from an aircraft comprising a container containing agents and being constructed and arranged to be removably attached to an aircraft, said container defining a generally circular opening in its upper position for receiving agents to be dispersed, a second opening, rotating dispersion means connected to said container in communication with said second opening for spreading agent to the surrounding area, stabilizing means secured to said container for keeping the container in a predetermined attitude relative to the aircraft and the central axis of the container substantially in a predetermined position parallel with the flight direction of the aircraft when the dispersion device rotates, substantially independent of the amount of agent in the container and the flying speed of the aircraft, said stabilizing means also including an angular collar disposed around said circular opening, which collar slopes inwardly substantially toward the center of the container whereby said collar functions to stabilize the container in the vertical attitude and reduces the air resistance caused by the circular opening of the container.

4. Apparatus as set forth in claim 3 in which the container is in the form of a hollow sphere at its upper end and a hollow truncated cone at its lower end, with the cone defining said second opening at its lower end for admitting agent to said rotating dispersion means and the sphere defining the circular opening at its upper end.

5. Apparatus spreading fertilizer, plant killer, or like agent from an aircraft comprising a container containing this agent and constructed and arranged to be removably connected to an aircraft, said container including an opening for discharging said agent and stabilizing means on the container comprising an angular collar directed inwardly toward substantially the center of the container and disposed around an opening for filling the container with agent defined by the container in its upper portion, with the semi-circular portion of the collar located forward of the container in the direction of flight having less extension than the other half of said collar.

6. Apparatus as set forth in claim 5 wherein the container is in the form of a hollow sphere at its upper end and a hollow truncated cone at its lower end and in which the collar portion of the stabilizing means is circularly shaped and defines the opening in the container for receiving agent and the hollow truncated cone defines an upper large opening connected to the hollow spherical portion of the container and a lower smaller opening forming the discharge opening of the container.

* * * * *